US00RE48343E

(19) United States
(12) Reissued Patent
Donegan et al.

(10) Patent Number: US RE48,343 E
(45) Date of Reissued Patent: Dec. 8, 2020

(54) HOPPER TYPE WILD BIRD FEEDER

(71) Applicant: Classic Brands, LLC, Denver, CO (US)

(72) Inventors: Robert Donegan, Denver, CO (US); James Carter, Denver, CO (US); Bryan Krueger, Denver, CO (US)

(73) Assignee: Classic Brands, LLC, Denver, CO (US)

(21) Appl. No.: 16/013,651

(22) Filed: Jun. 20, 2018

Related U.S. Patent Documents

Reissue of:
(64) Patent No.: 8,857,374
Issued: Oct. 14, 2014
Appl. No.: 13/107,841
Filed: May 13, 2011

U.S. Applications:
(60) Provisional application No. 61/330,842, filed on May 3, 2010.

(51) Int. Cl.
*A01K 61/02* (2006.01)
*A01K 39/012* (2006.01)

(52) U.S. Cl.
CPC ..... *A01K 39/012* (2013.01)

(58) Field of Classification Search
CPC ..... A01K 39/012
See application file for complete search history.

(56) References Cited

U.S. PATENT DOCUMENTS

| | | | |
|---|---|---|---|
| 117,807 | A | 8/1871 | Orndoff |
| D8,908 | S | 1/1876 | Wiley |
| 276,392 | A | 4/1883 | Gregory |
| 447,006 | A | 2/1891 | Sweeney |
| 632,167 | A | 8/1899 | Biesmeyer |
| 727,597 | A | 5/1903 | Day |
| 813,954 | A | 2/1906 | Davis |
| D43,781 | S | 4/1913 | Sanford |
| 1,251,935 | A | 1/1918 | Stevens |
| D63,321 | S | 11/1923 | Pirson |
| 1,558,316 | A | 10/1925 | Tipple |
| 1,634,569 | A | 7/1927 | Bray |
| 1,718,432 | A | 6/1929 | Qualmann |

(Continued)

OTHER PUBLICATIONS

US. Appl. No. 29/437,619, filed Nov. 19, 2012, Krueger.

(Continued)

*Primary Examiner* — Jeffrey L Gellner
(74) *Attorney, Agent, or Firm* — Polsinelli P.C.

(57) ABSTRACT

There are generally two styles of modern bird feeders: the tubular feeder with a tubular reservoir and several perches attached to the tubular reservoir at various positions around the reservoir, and the more traditional rectangular bin style with one or two feeding stations. These bin feeders are constructed to feed only general bird seed of mixed variety and are not selectively configurable to feed a specific small seed like thistle. The disclosed bin feeder includes removable and repositionable bin sidewalls with appropriately shaped upper and lower longitudinal edges to exclusively provide appropriate openings for thistle feed along one of the longitudinal edges or an appropriate opening for generally larger seed along the other of the longitudinal edges.

14 Claims, 13 Drawing Sheets

Amended

(56) References Cited

U.S. PATENT DOCUMENTS

D81,602 S 7/1930 Teague
1,791,956 A 2/1931 Cowles
D87,460 S 8/1932 Cook
1,879,318 A 9/1932 Klein
1,891,042 A 12/1932 Benoit
D109,128 S 4/1938 Copeman
D115,321 S 6/1939 Pueschel
2,283,373 A 5/1942 Krafft
2,350,922 A 6/1944 Planeta
2,417,178 A 3/1947 Ritter
D153,759 S 5/1949 Blatt
2,510,721 A 6/1950 Smith
2,531,915 A 11/1950 Maly
D164,692 S 10/1951 Kelly
D165,799 S 1/1952 Stedman
D167,179 S 7/1952 Stewart
2,634,705 A 4/1953 Mayes
D170,150 S 8/1953 Kowap
D173,658 S 12/1954 Jones
2,696,803 A 12/1954 Deffenbaugh
D174,139 S 3/1955 Sadler
2,725,663 A 12/1955 Mullen
D178,917 S 10/1956 England et al.
2,773,474 A 12/1956 Nugent
2,786,446 A 3/1957 Wilson
D180,686 S 7/1957 Everett
2,804,844 A 9/1957 Gigliotti
2,887,987 A 5/1959 Fitzgerald et al.
D185,456 S 6/1959 Michalek et al.
2,891,508 A 6/1959 Bower
2,944,516 A * 7/1960 Malloy, Sr. ..... 119/52.2
2,971,671 A 2/1961 Shakman
2,987,041 A 6/1961 Bard
3,022,768 A * 2/1962 Lynch ..... 119/52.3
3,051,126 A 8/1962 Merritt et al.
3,051,303 A 8/1962 Daanen
D193,558 S 9/1962 Perry
D194,750 S 3/1963 Dahmus
3,090,354 A 5/1963 Merritt et al.
3,136,296 A 6/1964 Luin
3,145,690 A 8/1964 Bachman
D199,995 S 1/1965 Knodt
D200,778 S 4/1965 Pregont
3,244,150 A 4/1966 Benton
D206,975 S 2/1967 Dawson
3,307,602 A 3/1967 Boster
3,316,884 A 5/1967 Viggars
3,372,676 A 3/1968 Williams
D216,002 S 11/1969 Stone
D216,361 S 12/1969 Pappas, Jr.
3,499,413 A 3/1970 Heard
D217,470 S 5/1970 Morrow
3,526,335 A 9/1970 Swett et al.
3,693,310 A 9/1972 Middleton
D230,948 S 3/1974 Moon
D234,180 S 1/1975 Dart et al.
D235,744 S 7/1975 England
3,901,192 A 8/1975 Adams
3,967,576 A 7/1976 Soerensen
3,977,363 A 8/1976 Fisher, Jr.
D241,699 S 10/1976 Barecki
D241,860 S 10/1976 Calamia
D244,786 S 6/1977 Dryden
D244,883 S 6/1977 Rohrmuller
4,030,451 A 6/1977 Miller
D245,349 S 8/1977 Fisher, Jr.
D245,643 S 8/1977 Orfei
D245,927 S 9/1977 Edwards et al.
D248,006 S 5/1978 Christian
D249,726 S 9/1978 Cosman
4,144,842 A 3/1979 Schlising
4,188,913 A 2/1980 Earl et al.
4,194,714 A 3/1980 Schultz
4,201,155 A 5/1980 Hyde, Jr.
D257,179 S 9/1980 Campo
4,223,637 A 9/1980 Keefe
D258,338 S 2/1981 Gersin
D260,843 S 9/1981 Laird et al.
4,327,669 A 5/1982 Blasbalg
4,328,605 A 5/1982 Hutchison et al.
4,331,104 A 5/1982 Clarke
D266,611 S 10/1982 Metts et al.
D267,355 S 12/1982 Blasbalg
D268,056 S 2/1983 Campbell-Kelly et al.
D268,362 S 3/1983 Wong
4,389,975 A 6/1983 Fisher, Jr.
D272,507 S 2/1984 Conti
D272,508 S 2/1984 Conti
4,444,324 A 4/1984 Grenell
D274,013 S 5/1984 Sun
D274,563 S 7/1984 Blasbalg
4,466,376 A 8/1984 Wells
D276,510 S 11/1984 Bent et al.
D277,514 S 2/1985 Bescherer
D277,739 S 2/1985 Grammas et al.
D278,168 S 3/1985 Latham et al.
D278,751 S 5/1985 Seager
D282,019 S 12/1985 Kilham
D284,033 S 5/1986 Brodsky
D285,840 S 9/1986 Poon
D289,143 S 4/1987 Guillaume
D289,210 S 4/1987 Tucker et al.
D289,211 S 4/1987 Riha
4,664,066 A 5/1987 Steuernagel et al.
D290,769 S 7/1987 Taylor
D290,773 S 7/1987 Liethen
4,682,461 A 7/1987 Sizemore
D292,372 S 10/1987 Sykes
4,712,512 A 12/1987 Schreib et al.
4,732,112 A 3/1988 Fenner et al.
4,738,221 A 4/1988 Nock
D297,074 S 8/1988 Burke et al.
4,798,172 A 1/1989 Clarke
D299,770 S 2/1989 Coffer
4,821,681 A 4/1989 Tucker
D300,882 S 5/1989 Olson
4,896,628 A 1/1990 Kadunce
4,901,673 A 2/1990 Overstreet
4,938,168 A 7/1990 Meidell
D309,858 S 8/1990 Meyersburg
D313,169 S 12/1990 Scott et al.
4,974,547 A 12/1990 Graham
4,986,219 A 1/1991 Harris
4,989,548 A 2/1991 Short et al.
4,996,947 A 3/1991 Petrides
5,033,411 A 7/1991 Brucker
D324,436 S 3/1992 Embree
5,094,417 A 3/1992 Creed
5,105,765 A 4/1992 Loken
D326,003 S 5/1992 Embree
D326,286 S 5/1992 Kerivan
5,115,343 A 5/1992 Bennett
5,140,945 A 8/1992 Barnhart et al.
D329,892 S 9/1992 Brister
5,168,830 A 12/1992 Deglis
D334,133 S 3/1993 Hartzheim
5,191,857 A 3/1993 Boaz
D334,635 S 4/1993 Wenstrand
D335,006 S 4/1993 Blasbalg
5,207,180 A 5/1993 Graham
D337,271 S 7/1993 Pezzoli et al.
D338,317 S 8/1993 Woodward
5,247,904 A 9/1993 Anderson
5,255,631 A 10/1993 Anderson
5,265,557 A 11/1993 Lovitz
5,269,242 A 12/1993 Toldi
D343,030 S 1/1994 Harwick, Jr.
5,289,796 A 3/1994 Armstrong
5,291,855 A 3/1994 Laverty
D349,981 S 8/1994 Fasino
D351,691 S 10/1994 Lipton
D351,692 S 10/1994 Cossey
D352,575 S 11/1994 Bransky et al.
D352,787 S 11/1994 Hulse

(56) References Cited

U.S. PATENT DOCUMENTS 5,361,723 A 11/1994 Burleigh
D354,079 S 1/1995 Shapiro
D360,495 S 7/1995 Sanderson
D360,829 S 8/1995 Leeds
D365,893 S 1/1996 Thorp
D366,413 S 1/1996 Tober
5,479,879 A 1/1996 Biek
5,490,480 A 2/1996 Dumond
D370,313 S 5/1996 Nottingham et al.
D370,315 S 5/1996 Miller
D371,226 S 6/1996 Lee
D371,227 S 6/1996 Lee
D371,230 S * 6/1996 Nottingham et al. ..... D30/126
D371,979 S 7/1996 Nottingham et al.
5,533,467 A 7/1996 Lancia
5,558,040 A 9/1996 Colwell et al.
D376,731 S 12/1996 Lin
D380,066 S * 6/1997 Green et al. ..... D30/124
5,655,477 A 8/1997 Hoffman et al.
D383,878 S 9/1997 Merino et al.
D384,443 S 9/1997 Olfert
D384,505 S 10/1997 Stewart
D386,834 S 11/1997 Nissim et al.
D386,835 S 11/1997 Passamare
D386,836 S 11/1997 Hunt
5,682,835 A 11/1997 Walter et al.
D388,312 S 12/1997 Sorkin
5,701,841 A 12/1997 Fasino
5,711,247 A 1/1998 Henshaw
D390,490 S 2/1998 Ruderick
5,729,949 A 3/1998 Hartzheim
5,775,256 A 7/1998 Henshaw
5,782,200 A 7/1998 Knowles et al.
D397,529 S 8/1998 Fuller et al.
D399,611 S 10/1998 Ericson et al.
5,829,382 A 11/1998 Garrison
D406,307 S 3/1999 Kang
D408,420 S 4/1999 Buter
5,947,054 A 9/1999 Liethen
D414,901 S 10/1999 Cirelli
D420,176 S 2/2000 Heinzeroth
D421,709 S 3/2000 Haslem et al.
D425,259 S 5/2000 Lang
6,079,361 A 6/2000 Bowell et al.
D428,437 S 7/2000 Hmelar et al.
D428,537 S 7/2000 Miller
6,095,087 A * 8/2000 Bloedorn ..... A01K 39/012 119/429
6,119,627 A 9/2000 Banyas et al.
D431,760 S 10/2000 Sullivan
D433,633 S 11/2000 La Fata
6,145,477 A 11/2000 Jansen
D434,980 S 12/2000 Suzuki
D435,666 S 12/2000 Barsomian
D440,361 S 4/2001 Colwell
6,213,054 B1 4/2001 Marshall
6,253,706 B1 7/2001 Sloop
D448,290 S 9/2001 Schultz et al.
6,305,321 B1 * 10/2001 Potente ..... 119/52.4
D451,251 S 11/2001 Chrisco et al.
D452,929 S 1/2002 Perelli
6,360,690 B1 3/2002 Canby
6,408,788 B1 6/2002 Lieb et al.
D459,840 S 7/2002 Lian
6,415,737 B2 7/2002 Banyas et al.
6,418,878 B1 7/2002 Cathell et al.
D461,827 S 8/2002 Koebbe
6,427,629 B1 8/2002 Lush
D462,172 S 9/2002 Aurelio, Jr.
D462,286 S 9/2002 Perelli
6,450,120 B1 * 9/2002 Nylen ..... A01K 39/012 119/52.2
6,457,439 B1 10/2002 Engelking
D466,255 S 11/2002 Kuelbs
D466,656 S 12/2002 Kuelbs et al.
D467,513 S 12/2002 Neff
D468,368 S 1/2003 Jones
D470,630 S 2/2003 Kuelbs
D471,327 S 3/2003 Kuelbs
D472,490 S 4/2003 Perelli
6,543,384 B2 4/2003 Cote
6,546,894 B2 4/2003 Chrisco et al.
D475,128 S 5/2003 Svendsen et al.
6,561,128 B1 5/2003 Carter
6,584,933 B1 7/2003 Stone
6,591,781 B2 7/2003 Hardison
D478,475 S 8/2003 Backes et al.
6,622,654 B2 9/2003 Fasino
D480,291 S 10/2003 Sorkin
D482,262 S 11/2003 Sorkin
6,659,041 B1 12/2003 Curts
D485,930 S 1/2004 Chen
6,701,867 B1 * 3/2004 Garrison ..... 119/57.8
D490,576 S 5/2004 Rich et al.
D491,019 S 6/2004 Marsden et al.
D491,443 S 6/2004 Lowery
D493,053 S 7/2004 Snell
D495,900 S 9/2004 Mayse
6,789,916 B2 9/2004 Ruggles
6,792,891 B1 9/2004 Coburn et al.
D497,226 S 10/2004 Nauert
D497,406 S 10/2004 King
D497,458 S 10/2004 Nauert
D499,515 S 12/2004 Schulzw et al.
D500,243 S 12/2004 Turek
6,830,009 B1 12/2004 Kuelbs
D500,668 S 1/2005 Kelly et al.
D503,019 S 3/2005 Swift et al.
6,863,024 B1 3/2005 Obenshain
6,866,004 B1 3/2005 Lush
D504,547 S 4/2005 Nauert
D504,746 S 5/2005 Lee
D505,521 S 5/2005 Schrodt
D505,755 S 5/2005 Lundstrom et al.
6,895,894 B2 * 5/2005 Fort, II ..... 119/57.8
6,901,882 B2 6/2005 Kuelbs
D509,325 S 9/2005 Jung et al.
6,945,192 B2 9/2005 Cote
D511,866 S 11/2005 Lundstrom et al.
D512,661 S 12/2005 Morris et al.
D512,800 S 12/2005 Jung et al.
6,986,322 B2 1/2006 Lumpkin et al.
D514,319 S 2/2006 King et al.
D515,748 S 2/2006 Jung et al.
D515,916 S 2/2006 Bleuer
D516,413 S 3/2006 Anderson et al.
7,017,517 B2 3/2006 Paquette
7,017,521 B2 3/2006 Kuelbs
D518,380 S 4/2006 Moran
7,021,241 B2 4/2006 Nock
7,032,538 B1 * 4/2006 Lush ..... A01K 39/012 119/459
7,032,539 B1 4/2006 Obenshain
D522,180 S 5/2006 Goria, II
D523,141 S 6/2006 Massey
D524,490 S 7/2006 Obenshain
7,086,352 B2 8/2006 Goodger
7,096,821 B2 8/2006 Ruff
D535,445 S 1/2007 Obenshain
7,168,392 B2 1/2007 Kuelbs
7,185,605 B1 3/2007 Lush
D540,349 S 4/2007 Waki
D542,659 S 5/2007 Meether et al.
D542,982 S 5/2007 Wendell
D543,256 S 5/2007 Chen
D544,942 S 6/2007 Chen
7,234,416 B2 6/2007 Hoff
D548,587 S 8/2007 DuVal et al.
7,258,075 B1 8/2007 Jones et al.
7,261,056 B2 8/2007 Hunter et al.
D551,952 S 10/2007 Palmer
7,278,613 B2 10/2007 Roy
7,287,486 B2 10/2007 Hunter
D556,568 S 12/2007 DuVal

(56) References Cited

U.S. PATENT DOCUMENTS

D557,595 S 12/2007 Ernst et al.
7,302,911 B1 12/2007 Lush
D558,567 S 1/2008 Ismert
D561,021 S 2/2008 DuVal et al.
D561,040 S 2/2008 Sequeira
D567,098 S 4/2008 Sequeira
D568,754 S 5/2008 Sequeira
7,370,607 B2 5/2008 O'Dell
7,373,901 B2 5/2008 Baynard
D575,118 S 8/2008 Bignon
D575,591 S 8/2008 Bonetti
7,409,922 B1 8/2008 Baynard et al.
D578,379 S 10/2008 Sorkin
D581,183 S 11/2008 Kutscha et al.
D581,259 S 11/2008 Portz
7,448,346 B1 11/2008 Stone et al.
7,451,580 B2 11/2008 Kelly et al.
7,469,656 B2 12/2008 Hunter et al.
7,484,475 B2 2/2009 Milliner
7,503,282 B1 3/2009 Lush
7,506,611 B1 * 3/2009 Lush ..... 119/52.1
D590,541 S 4/2009 Chaoui
7,516,716 B2 4/2009 Puckett et al.
D591,589 S 5/2009 Myers et al.
D592,046 S 5/2009 Myers et al.
D592,362 S 5/2009 Rutherford et al.
7,530,330 B1 5/2009 Valle
D594,737 S 6/2009 Kelly et al.
7,540,260 B2 6/2009 Rich et al.
7,540,262 B2 6/2009 Kuelbs
7,549,394 B2 6/2009 Nock
D596,033 S 7/2009 Zach et al.
D599,159 S 9/2009 Stein
D600,099 S 9/2009 Dahlin
7,610,875 B2 11/2009 Webber
D606,447 S 12/2009 West et al.
D606,708 S 12/2009 McMullen
D607,612 S 1/2010 Yang
D609,064 S 2/2010 Najaryan et al.
D609,864 S 2/2010 Tsai
7,654,225 B2 2/2010 Madsen et al.
D612,108 S 3/2010 Torres et al.
D612,730 S 3/2010 Rushe
7,669,553 B2 3/2010 White et al.
D614,019 S 4/2010 Goodman et al.
D616,040 S 5/2010 Spencer
D616,288 S 5/2010 Simon et al.
7,721,677 B1 5/2010 McClaskey
7,726,259 B2 6/2010 Hepp et al.
7,739,982 B2 6/2010 Cote
7,743,732 B2 6/2010 Webber
D620,074 S 7/2010 Muhlenbruck
D621,241 S 8/2010 Mirer et al.
D621,268 S 8/2010 Morabito
D622,910 S 8/2010 Puckett
D623,805 S 9/2010 Vosbikian
7,798,099 B2 9/2010 Vosbikian
7,874,264 B2 1/2011 McMullen
D632,952 S 2/2011 Dablemont
D635,844 S 4/2011 Boothby
D636,238 S 4/2011 Elmelund
7,930,994 B2 4/2011 Stone et al.
D638,501 S 5/2011 Fishman
D638,588 S 5/2011 Vosbikian
7,958,845 B2 6/2011 Gardner
D643,442 S 8/2011 Sato et al.
D643,855 S 8/2011 Taniguchi et al.
D644,090 S 8/2011 Sittig
7,997,434 B2 8/2011 Benetti
8,006,642 B2 8/2011 Vosbikian
8,028,490 B2 10/2011 Kelly et al.
D649,299 S 11/2011 Lush
D649,302 S 11/2011 Hickok
D650,261 S 12/2011 McDuff et al.
8,070,380 B2 12/2011 Pucillo et al.
D652,059 S 1/2012 Sato et al.
D656,690 S 3/2012 Tu
D657,399 S 4/2012 Nemoto
8,156,894 B1 4/2012 Krah
D658,684 S 5/2012 Roman
D661,573 S 6/2012 Paik et al.
D664,307 S 7/2012 Krueger et al.
D664,437 S 7/2012 Barel
8,230,809 B2 7/2012 Cote
8,245,666 B2 8/2012 Sena et al.
D667,294 S 9/2012 Wang
8,272,607 B2 9/2012 Bonnema
8,276,541 B2 10/2012 LoRocco et al.
D671,276 S 11/2012 Krueger
D671,277 S 11/2012 Vosbikian et al.
D671,692 S 11/2012 Carter
8,347,818 B2 1/2013 Cowger et al.
D676,614 S 2/2013 Fields et al.
D677,016 S 2/2013 Carter
8,413,605 B2 4/2013 Baynard et al.
2003/0033985 A1 2/2003 Hardison
2003/0136347 A1 7/2003 Fasino
2003/0226514 A1 * 12/2003 Cote ..... A01K 39/0113 119/57.9
2004/0098942 A1 5/2004 Lee et al.
2004/0216684 A1 11/2004 Obenshain
2004/0231606 A1 11/2004 Nock
2004/0250777 A1 12/2004 Stachowiak
2004/0261726 A1 12/2004 Lumpkin
2005/0120967 A1 6/2005 Ruff
2005/0257749 A1 11/2005 Kuelbs
2005/0263085 A1 12/2005 Rich
2006/0225658 A1 10/2006 Baynard
2006/0266295 A1 11/2006 McDarren
2006/0272585 A1 12/2006 O'Dell
2007/0034160 A1 2/2007 Nock
2007/0163506 A1 7/2007 Bloedorn
2007/0227453 A1 10/2007 Puckett et al.
2007/0227454 A1 10/2007 Fahey
2007/0266951 A1 11/2007 Berns
2008/0022936 A1 1/2008 Stone et al.
2008/0078329 A1 4/2008 Hunter et al.
2008/0105206 A1 5/2008 Rich et al.
2008/0127902 A1 6/2008 Bent et al.
2008/0134979 A1 6/2008 Crocker
2008/0210172 A1 9/2008 Waikas
2008/0276874 A1 11/2008 Evans
2008/0302304 A1 12/2008 Mayfield
2009/0020075 A1 1/2009 Wood et al.
2009/0071408 A1 3/2009 Wechsler
2009/0223456 A1 9/2009 Hunter et al.
2009/0260576 A1 10/2009 Vosbikian
2009/0283046 A1 11/2009 Black
2009/0304900 A1 12/2009 Augustin
2010/0061091 A1 3/2010 Galipeau et al.
2010/0089330 A1 4/2010 McMullen
2010/0258054 A1 10/2010 Frazier
2010/0288200 A1 11/2010 Lush
2011/0067637 A1 3/2011 Baynard
2011/0073043 A1 3/2011 Dault
2011/0083609 A1 4/2011 Cote
2011/0088626 A1 4/2011 Hepp et al.
2011/0180004 A1 * 7/2011 Humphries et al. ..... 119/51.5
2011/0226186 A1 9/2011 Hunter et al.
2012/0037080 A1 2/2012 Hepp et al.
2012/0055410 A1 * 3/2012 Cote ..... 119/52.3
2012/0234249 A1 9/2012 Gaze

OTHER PUBLICATIONS

U.S. Appl. No. 29/437,624, filed Nov. 19, 2012, Krueger.
U.S. Appl. No. 29/390,071, filed Apr. 19, 2011, Krueger et al.
U.S. Appl. No. 29/387,515, filed Mar. 14, 2011, Carter et al.
U.S. Appl. No. 29/387,516, filed Mar. 14, 2011, Carter.
U.S. Appl. No. 29/387,517, filed Mar. 14, 2011, Krueger.
U.S. Appl. No. 29/387,518, filed Mar. 14, 2011, Krueger et al.
U.S. Appl. No. 29/387,519, filed Mar. 14, 2011, Carter.
U.S. Appl. No. 29/387,520, filed Mar. 14, 2011, Krueger.

(56) References Cited

OTHER PUBLICATIONS

U.S. Appl. No. 13/420,063, filed Mar. 14, 2012, Carter et al.
U.S. Appl. No. 13/420,086, filed Mar. 14, 2012, Carter et al.
U.S. Appl. No. 29/416,886, filed Mar. 28, 2012, Carter.
U.S. Appl. No. 29/416,887, filed Mar. 28, 2012, Carter.
U.S. Appl. No. 29/427,461, filed Jul. 18, 2012, Krueger et al.
*Ex Parte Quayle Action*, Design U.S. Appl. No. 29/390,071, mailed Dec. 20, 2011, 4 pages.
Notice of Allowance, Design U.S. Appl. No. 29/390,071, mailed Mar. 26, 2012, 7 pages.
Response to *Ex Parte Quayle Action*, Design U.S. Appl. No. 29/390,071, filed Mar. 19, 2012, 20 pages.
Response to Restriction Requirement, Design U.S. Appl. No. 29/390,071, filed Dec. 12, 2011, 2 pages.
Restriction Requirement, Design U.S. Appl. No. 29/390,071, mailed Oct. 11, 2011, 4 pages.
Notice of Allowance, Design U.S. Appl. No. 29/427,461, mailed Oct. 4, 2012, 15 pages.
Restriction Requirement, Design U.S. Appl. No. 29/387,519, mailed Jun. 13, 2012, 4 pages.
Notice of Allowance, Design U.S. Appl. No. 29/387,520, mailed Jun. 15, 2012, 10 pages.
*Ex Parte Quayle Action*, Design U.S. Appl. No. 29/387,515, mailed Jun. 20, 2012, 5 pages.
Response to Restriction Requirement, Design U.S. Appl. No. 29/387,519, filed Jul. 5, 2012, 2 pages.
Non-Final Office Action, U.S. Appl. No. 29/387,516, mailed Jul. 6, 2012, 7 pages.
Response to *Ex Parte Quayle Action*, U.S. Appl. No. 29/387,515, filed Aug. 20, 2012, 7 pages.
Final Quayle Action, Design U.S. Appl. No. 29/387,515, mailed Aug. 28, 2012, 5 pages.
Notice of Allowance, Design U.S. Appl. No. 29/387,519, mailed Sep. 13, 2012, 11 pages.
Restriction Requirement, Design U.S. Appl. No. 29/387,517, mailed Oct. 12, 2011, 4 pages.
Response to Restriction, Design U.S. Appl. No. 29/387,517, filed Dec. 12, 2011, 2 pages.
Non-Final Office Action, Design U.S. Appl. No. 29/387,517, mailed Mar. 12, 2012, 7 pages.
Response to Non-Final Office Action, Design U.S. Appl. No. 29/387,517, filed Jun. 12, 2012, 13 pages.
Notice of Allowance, Design U.S. Appl. No. 29/387,517, mailed Jul. 3, 2012, 11 pages.
Response to Restriction Requirement, Design U.S. Appl. No. 29/416,890 filed Sep. 4, 2012, 13 pages.
Response to Non-Final Office Action, Design U.S. Appl. No. 29/687,516, filed Nov. 6, 2012, 10 pages.
Response to Final Office Action, Design U.S. Appl. No. 29/387,515, filed Nov. 19, 2012, 4 pages.
Cedar Works Squirrel Bin Feeder (date unknown), 10 pages, offered for sale no later than Mar. 13, 2010; also located at http://www.homedepot.com/webapp/wcs/stores/servlet/ProductDisplay?productId=203271339&storeId=10051&langId=-&catalogId=10053&cpncode=%2d1989988612d2&srccode=cii%5f22032207&cmmmc=shopping%2d%5f%2dthefind (last accessed Nov. 27, 2012), 3 pages.
U.S. Appl. No. 29/416,890, filed Mar. 28, 2012, Krueger.
U.S. Appl. No. 29/438,289, filed Nov. 28, 2012, Bruno et al.
U.S. Appl. No. 29/438,291, filed Nov. 28, 2012, Bruno et al.
U.S. Appl. No. 29/448,176, filed Mar. 11, 2013, Carter.
U.S. Appl. No. 13/855,523, filed Apr. 2, 2013, Donegan et al.
U.S. Appl. No. 13/855,565, filed Apr. 2, 2013, Donegan et al.
U.S. Appl. No. 13/901,321, filed May 23, 2013, Carter et al.
*Ex Parte Quayle Action*, U.S. Appl. No. 29/437,624, mailed Jun. 7, 2013, 23 pages.
Notice of Allowance, U.S. Appl. No. 29/387,515, mailed Dec. 18, 2012, 14 pages.
Notice of Allowance, U.S. Appl. No. 29/387,516, mailed Nov. 13, 2012, 11 pages.
Notice of Allowance, U.S. Appl. No. 29/387,518, mailed Dec. 21, 2012, 24 pages.
Notice of Allowance, U.S. Appl. No. 29/387,520, mailed Dec. 21, 2012, 8 pages.
Notice of Allowance, U.S. Appl. No. 29/416,886, mailed Jan. 10, 2013, 15 pages.
Notice of Allowance, U.S. Appl. No. 29/416,887, mailed Dec. 26, 2012, 15 pages.
Notice of Allowance, U.S. Appl. No. 29/416,890, mailed Dec. 20, 2012, 24 pages.
Non-Final Office Action, U.S. Appl. No. 13/855,565, mailed Sep. 27, 2013, 32 pages.
Non-Final Office Action, U.S. Appl. No. 13/855,523, mailed Sep. 30, 2013, 29 pages.
Non-Final Office Action, U.S. Appl. No. 13/420,086, mailed Oct. 7, 2013, 23 pages.

* cited by examiner

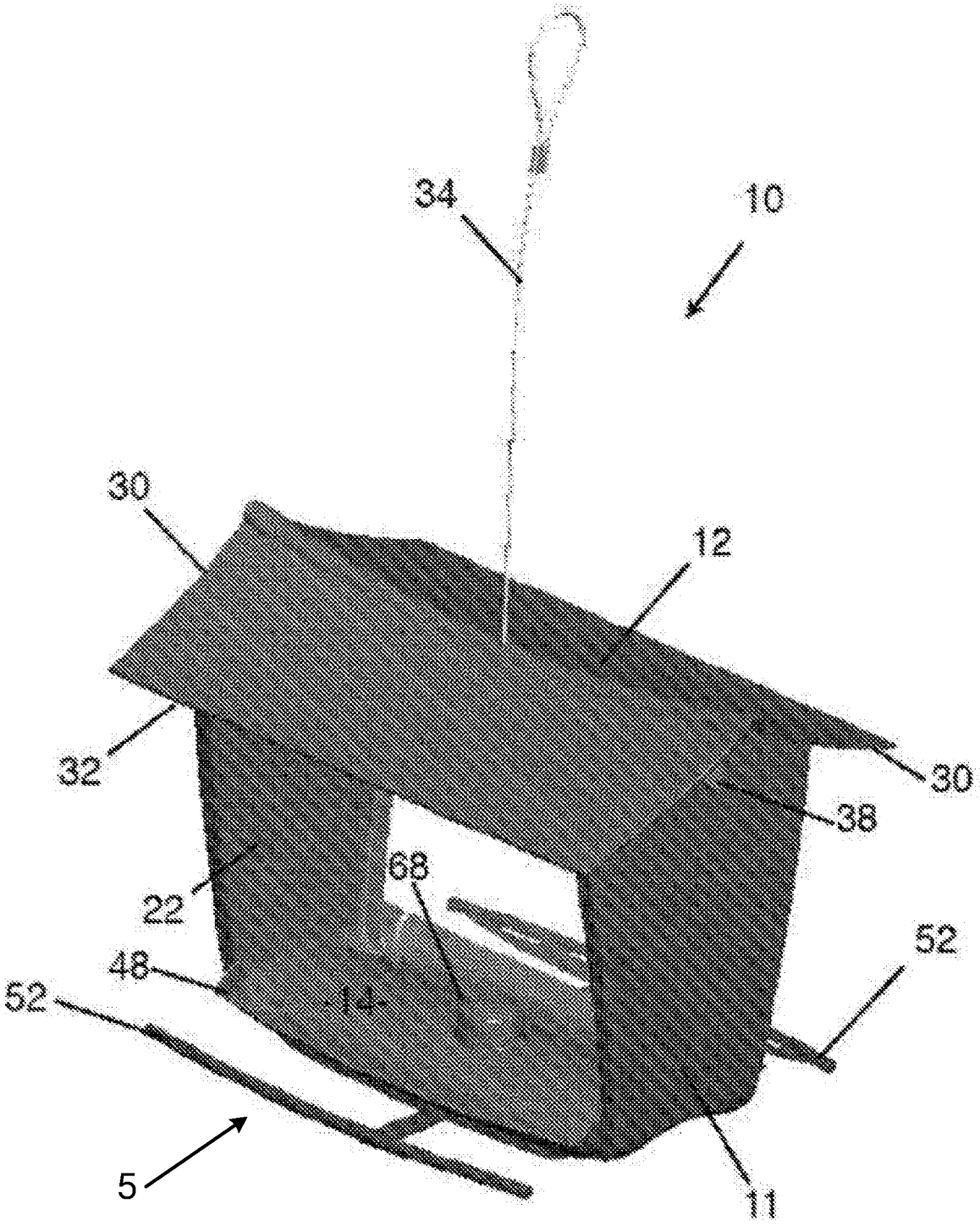
FIG. 1 Amended

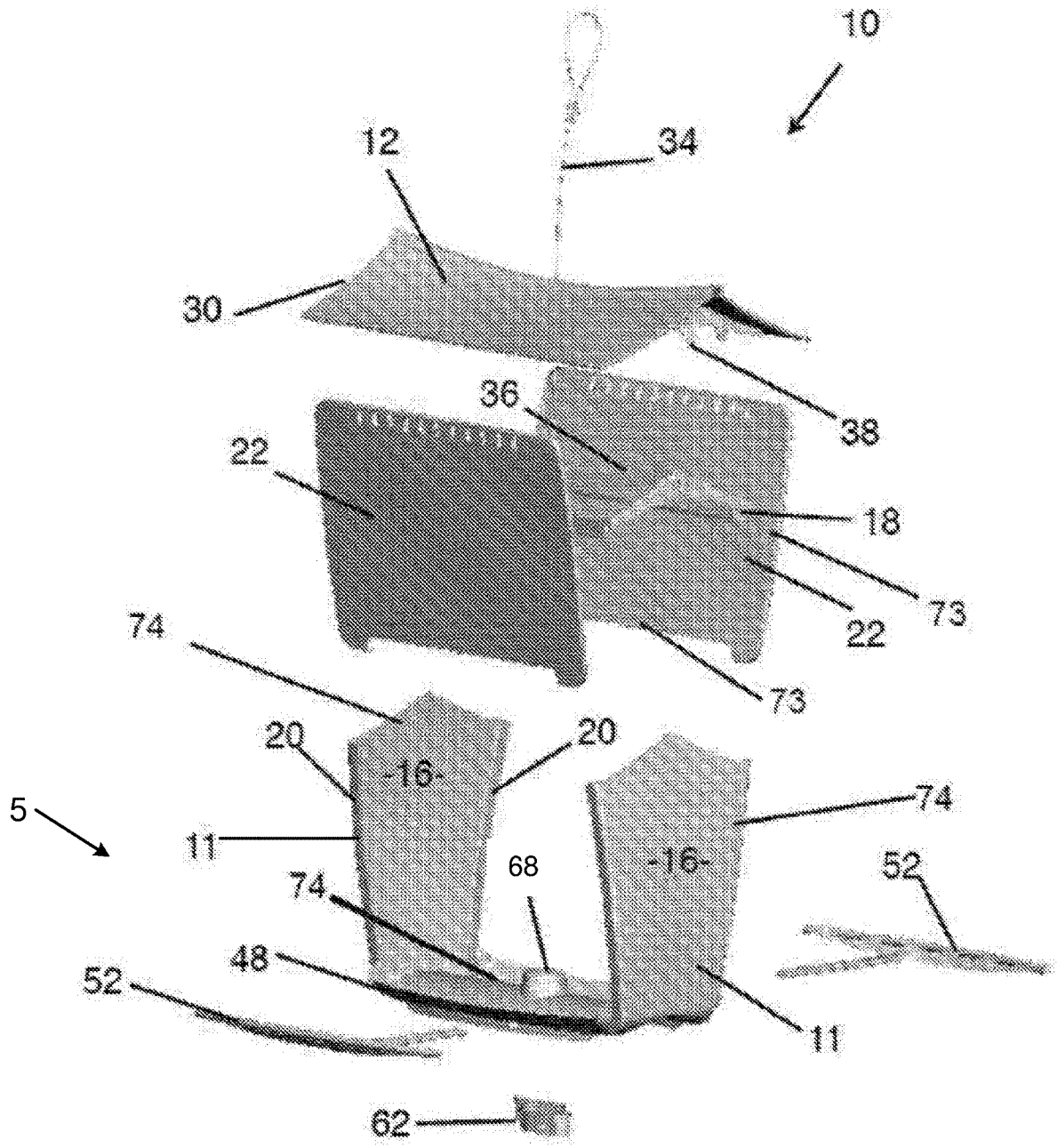
FIG. 2 Amended

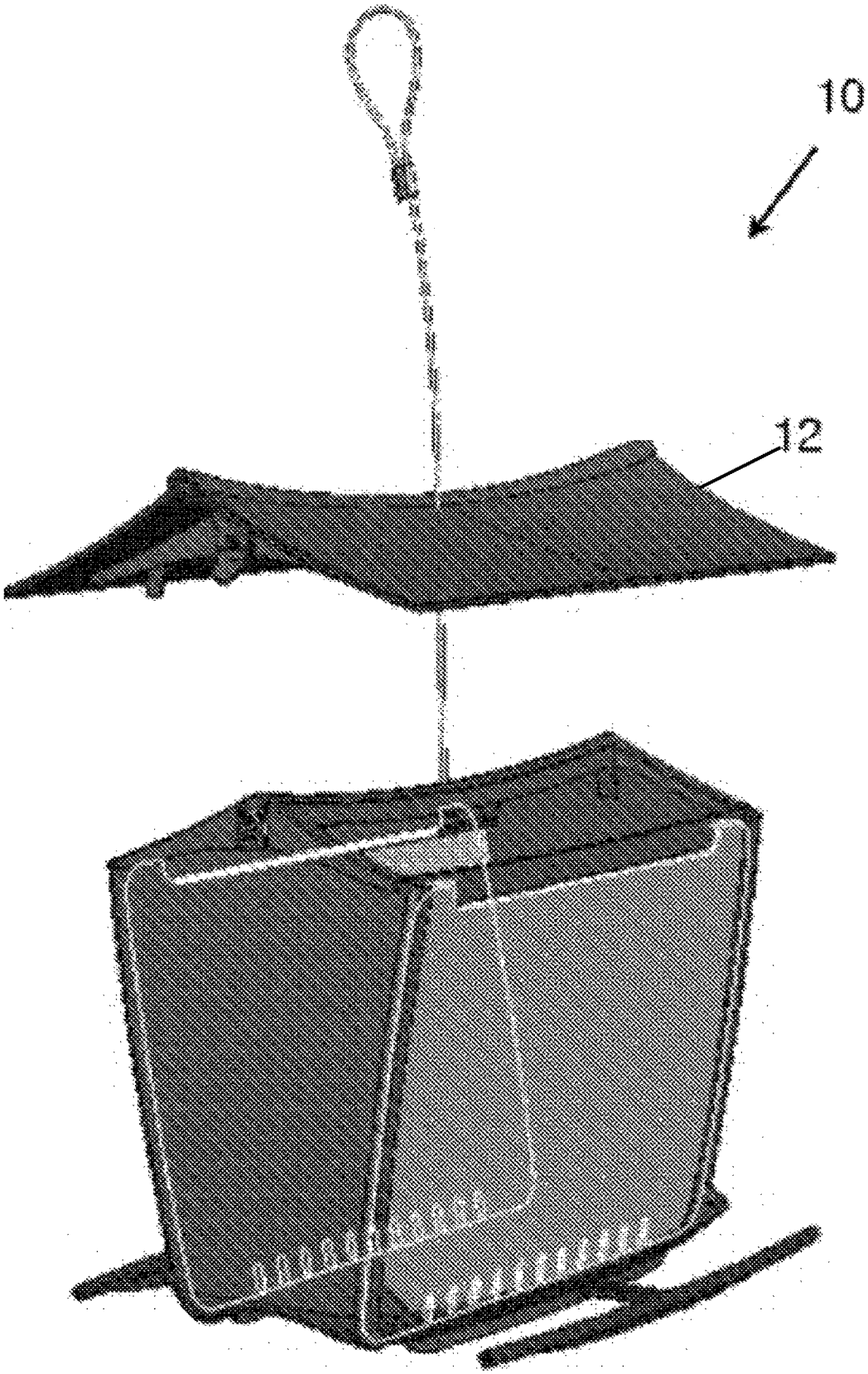
FIG. 8 Amended

HOPPER TYPE WILD BIRD FEEDER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

This application claims benefit from provisional patent application Ser. No. 61/330,842 which was filed May [13] *3*, 2010.

A traditional style of feeder for presenting seed to wild birds is the hopper style. This feeder is usually rectangular with a gable roof to protect the bin containing the seed, and a pair of window sidewalls forming the front and back walls for the bin. These sidewalls form a slot at the bottom of the bin for the seed in the bin to spill out onto a tray. Birds stand along the edges of the tray and feed from the spilled seed that seeps below the sidewalls of the hopper into the tray.

It is usual for these two sidewalls to be made of transparent material, usually a rectangular panes of plastic. This permits the owner of the bird feeder to see from a distance whether the bin needs to be refilled with birdseed.

Another type of feeder available from Cedar Works includes a single transparent sidewall made of a polymer sheet. This sidewall has a single notch along one edge. This sidewall can be removed from the slots in which it normally rests, the slots extending along the edges of the lateral walls. These lateral walls are made of wood. The transparent sidewall is accessed through a hinged lid which normally overlies the upper edge of the sidewall. This sidewall can be removed and flipped over, placing the notch either along the top edge or bottom edge of the sidewall. When the notch is positioned at the upper edge of the sidewall this feeder is intended for squirrels only. The owner of the feeder can enjoy watching this squirrel lift the hinge lid and reach inside to feed on the corn or other seeds in the bin. Alternatively the sidewall can be placed so that the single slot is located at the bottom. In this condition the seed is able to spill out on to the flat trough in front of the sidewall, so that birds as well as squirrels can be feed simultaneously from the same supply of seeds.

However there are other styles of feeders, for example tube style feeders that are intended to feed birds only. Among such tube feeders are feeders with very small restricted feed ports sized to permit small birds such as finches to access thistle seeds, apparently one of such small bird's favorite foods. Other feeders have a substantially larger port for feeding larger seeds to larger species of birds. There are also tube type feeders with adjustable or two position feeder ports. These feeders have rotating or sliding shutter that changes the size of the seed port from that appropriate for feeding the small thistle seeds, or alternatively the shutter is moved to expose or create a larger port for the passage of large seeds.

SUMMARY

Disclosed is a bin type feeder for wild birds with gable roof and adjustable perches that can be spaced controllably from a pair of oppositely facing sidewalls with feeding troughs at the lower edges of these sidewalls. These sidewalls are removable and reversible so that small feeder ports located along one longitudinal edge of the sidewall can be positioned either along the bottom edge adjacent the feeding trough to form a feeder specifically designed to feed small thistle type seed, or the sidewalls can be inverted to properly position a single broad slot or arch formed along the bottom edge of the sidewall. In this configuration the bin type feeder is appropriate for feeding bird feeds that include large seeds like sunflower seeds, with the small thistle-sized ports positioned along the uppermost edge of the sidewall out of access or contact with the supply of seed contained in the bin.

BRIEF DESCRIPTION OF THE FIGURES

FIG. 1 is the perspective view of the bin type feeder according to this disclosure with thistle type ports aligned along the lower edge of the removable transparent sidewall.

FIG. 2 is an exploded view of the parts is to assemble the bin type feeder of FIG. 1.

FIG. 8 shows a partially transparent view of the bin with the gable roof slid upwardly to expose the upper edges of the bin sidewalls.

DETAILED DESCRIPTION OF THE PREFERRED EMBODIMENT

Figure 3:
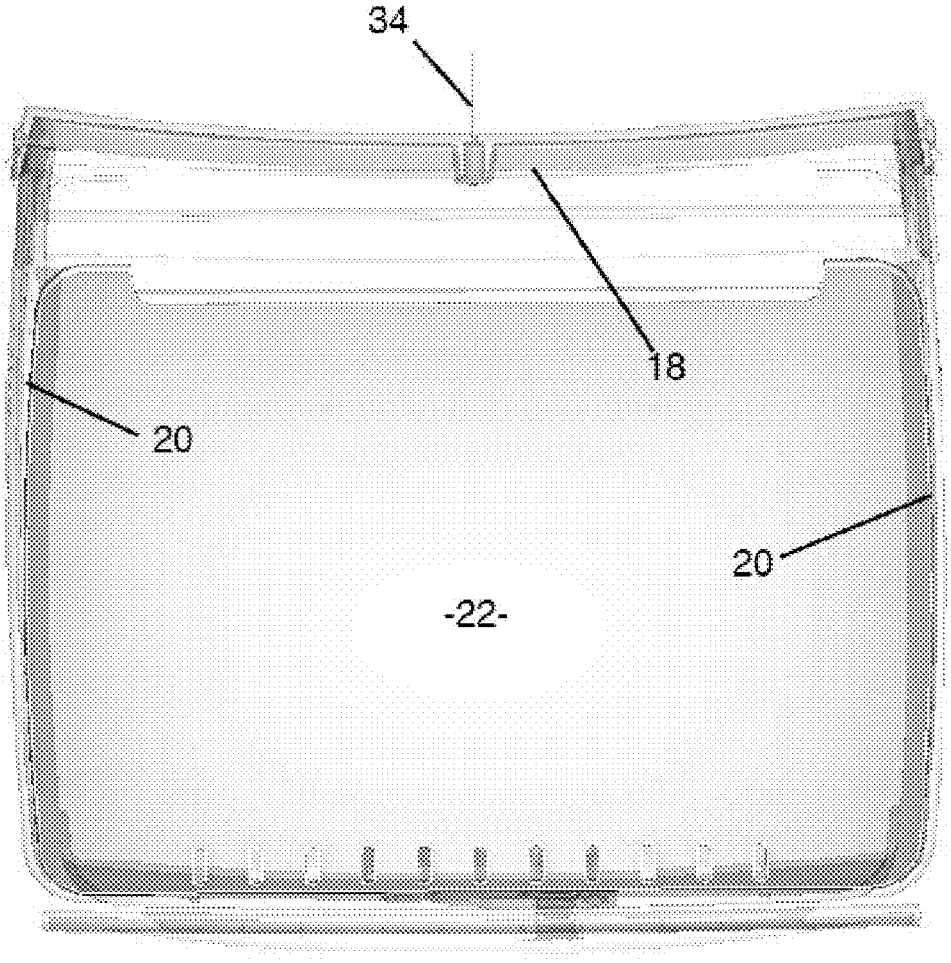
FIG. 3 is an elevation view showing the sidewall in place in slots along the side of the bin.

Referring to the accompanying figures, the feeder 10 has *one or more feeding stations 5, such as feeding troughs 48, adjacent corresponding perches 52 and* a bin 75 with sides that include at least one removable sidewall 22, and end walls 16, shown here as gable ends. All sides have edge portions, sidewall edge portions 73 and end wall edge portions 74, some of which, specifically the inward facing grooves 20 on the end wall edge portions 74, are sized and positioned to releasably hold a portion of the removable sidewalls.

As seen in the figures, the disclosed bin feeder 10 for wild birds is preferably made of an assembly of eight injection molded parts, and five fasteners. The hopper chassis 11 is an injection molded part with a substantially horizontally extending base which forms the floor 14 of the seed supply bin and generally upstanding end walls 16 integrally molded with the base. These end walls define a generally trapezoid shape with a wider upper portion and narrower bottom portion. The end walls are held in proper position by the hopper hanger panel 18 which extends across the upper most edges of the end walls. The hopper panel is fastened to the end walls at each end by a single self-tapping pan head screw.

A pair of adjustable perches is attached to the bottom surface of the bottom wall by the perch mount. The pair of adjustable perches and perch mount will be detailed below.

As shown in the figures, the end walls of the hopper chassis have inwardly facing grooves 20 to receive the corresponding edge portions of pair of specially formed sidewalls. These sidewalls 22 and 22 are preferably comprised of rectangular panels of die-cut polymer sheeting. These sidewalls are preferably transparent or at least translucent to permit the owner to assess at a glance whether the supply of seed contained in the seed bin formed between the end walls the removable side walls 22 and beneath the roof 12 is adequate or needs to be replenished.

Above all these parts and assemblies, a roof extends to shelter most of the rest of the construction from precipitation. The roof preferably has a gently sloping gable shape with protruding gable ends 30 and protruding rake edges 32 that form an overall look of a small gabled house. A robust wire or cable hanger 34 extends from a point where it is fixed at the geometric centre of the ridge beam portion 36 of the hanger panel 18, then up through a hole through the corresponding center of the roof, to an attachment loop at its distal end. As will be detailed, the roof has a pair of flexible finger-operated detents or latches 38 and 38 that snap onto and release from protrusions at the ridge of the gable ends of the hanger panel. Once the latches 38 are released the roof can be slid upwardly on the hanging wire to permit access to the large rectangular opening at the top of the bin for replenishing the seed in the bin hopper.

The removable roof also permits the side walls to be removed and selectively repositioned for dispensing either small thistle-type seed or larger general type seed, as will be detailed.

Figure 4:
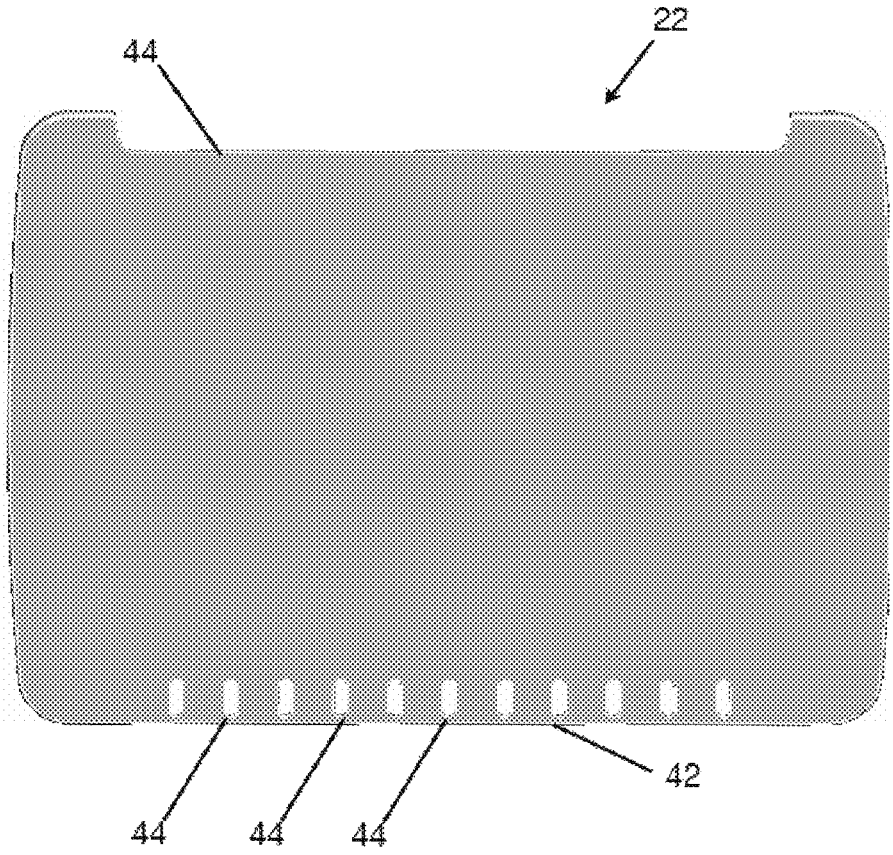
FIG. 4 is an elevation view of the removable and adjustable sidewall.
Figure 5:
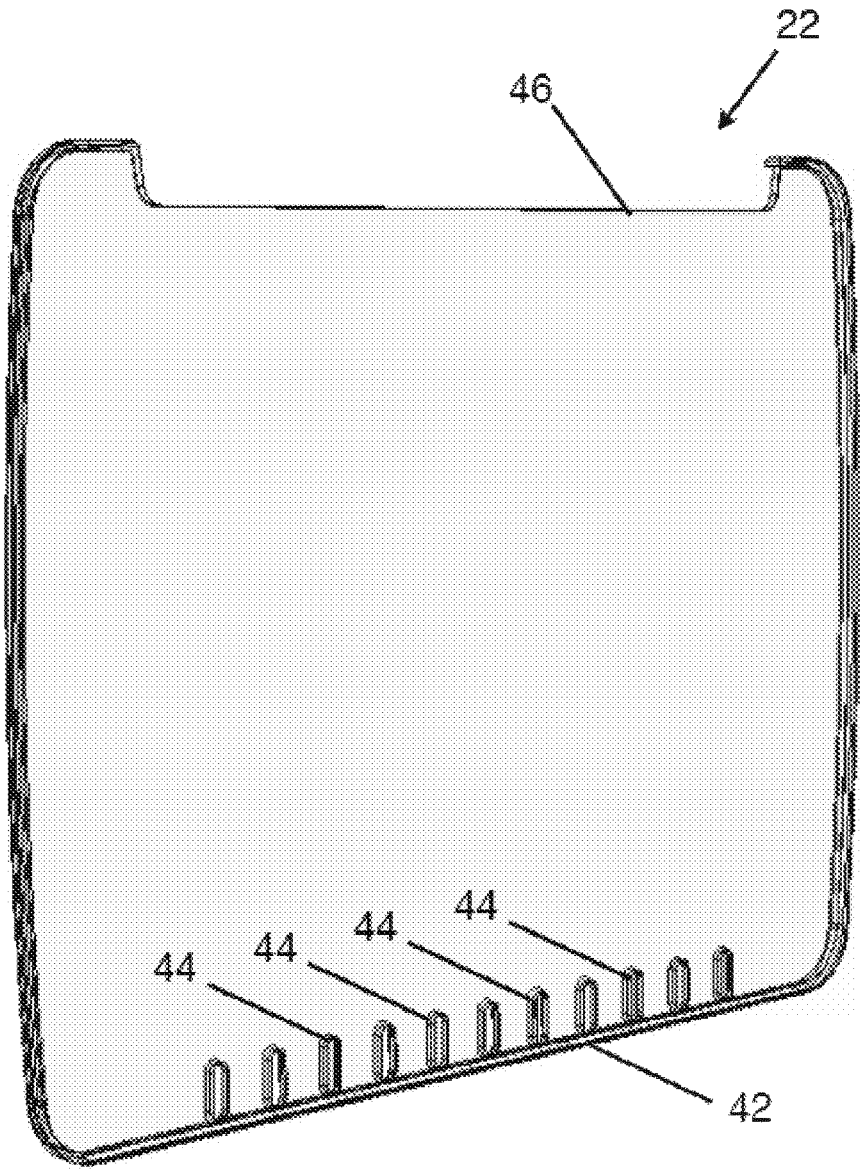
FIG. 5 is the perspective view of sidewall of FIG. 4.
Figure 6:
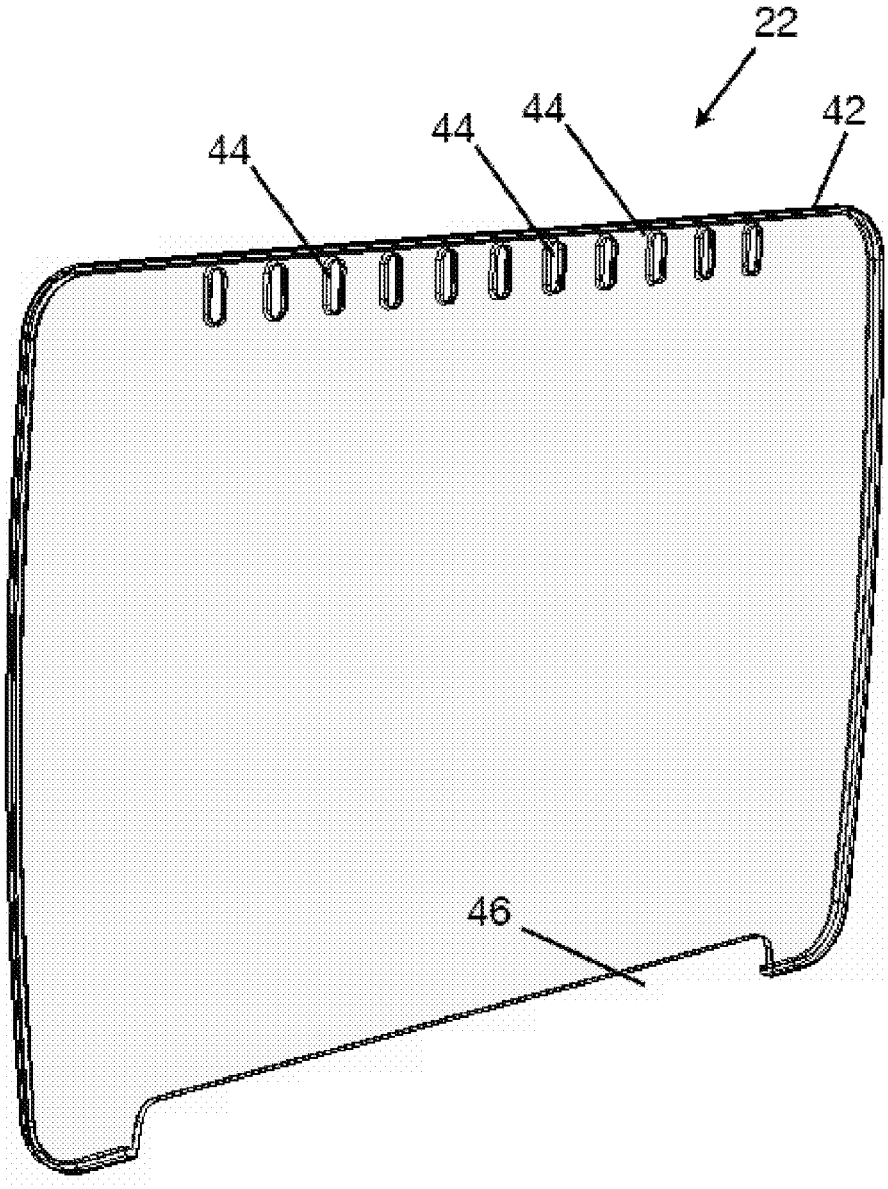
FIG. 6 is the sidewall with the thistle type seed ports along its upper edge and the single open arch forming a large seed port along the bottom edge.

The removable and reversible sidewalls 22 are generally of uniform thickness but have a specific and precise overall planar shape. The shorter sides are gently curved to correspond approximately to the curving shape of the bin chassis end walls and to slide into and out of the slots 20 mentioned above formed between portions of the hanger panel and the hopper chassis 11. The longitudinal bottom edge 42 (refer to FIGS. 4 [and], 5, *and 8*) is generally straight with a row of several, preferably about a dozen, small elongated slots or ports 44 spaced just above the lowermost edge. These slots are sized to dispense in a controllable manner thistle seed and to help restrict larger birds from accessing the thistle seed. The sizing of these thistle seed ports is well known in the industry, but preferably these thistle seeds ports are about 3½ mm wide×1 cm tall and round at the top and bottom. A single long arch shaped indentation constitutes the majority of the upper longitudinal edge 46 of the side wall panel. This has an overall dimension approximately 10 to 12 cm in overall width and about 2 cm tall. For thistle feeding, both panels are placed in their respective slots 20 on each side of the bin chassis with the thistle ports 44 along at the lower edge as shown in FIGS. 4 and 5. If the user decides to feed larger seeds, each of the side walls is removed from their slots 20, flipped over, and positioned as shown in FIG. 6, that is, with the large arch shaped indentation 46 facing downwardly and thus aligned along the bottom-most portion of the seed supply. Consequently the thistle seed ports are along the now upper edge of the side wall in close proximity to the roof when the roof is in its latched position.

Figure 7:
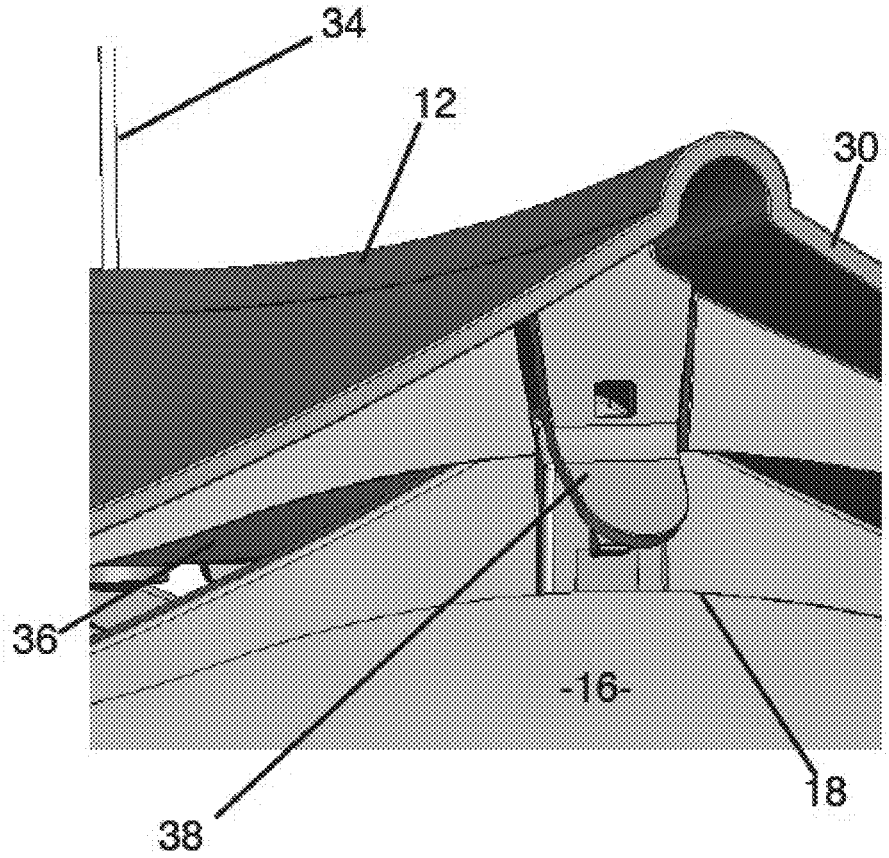
FIG. 7 the close up view of the finger operated detained latch located at the ridge of each gable end of the gable roof.

FIG. 7 shows a detail of the latching engagement formed along at the upper edge of the bin and walls and the corresponding portion of the hopper hanger panel. A single sloping detent is formed in the end of the hopper panel which normally rests in a correspondingly shaped opening in the centre of the flexible finger-operated latches 38 at each end of the roof. This latch is designed to resist accidental opening and to resist being opened by a hungry squirrel or the like.

Figure 9:
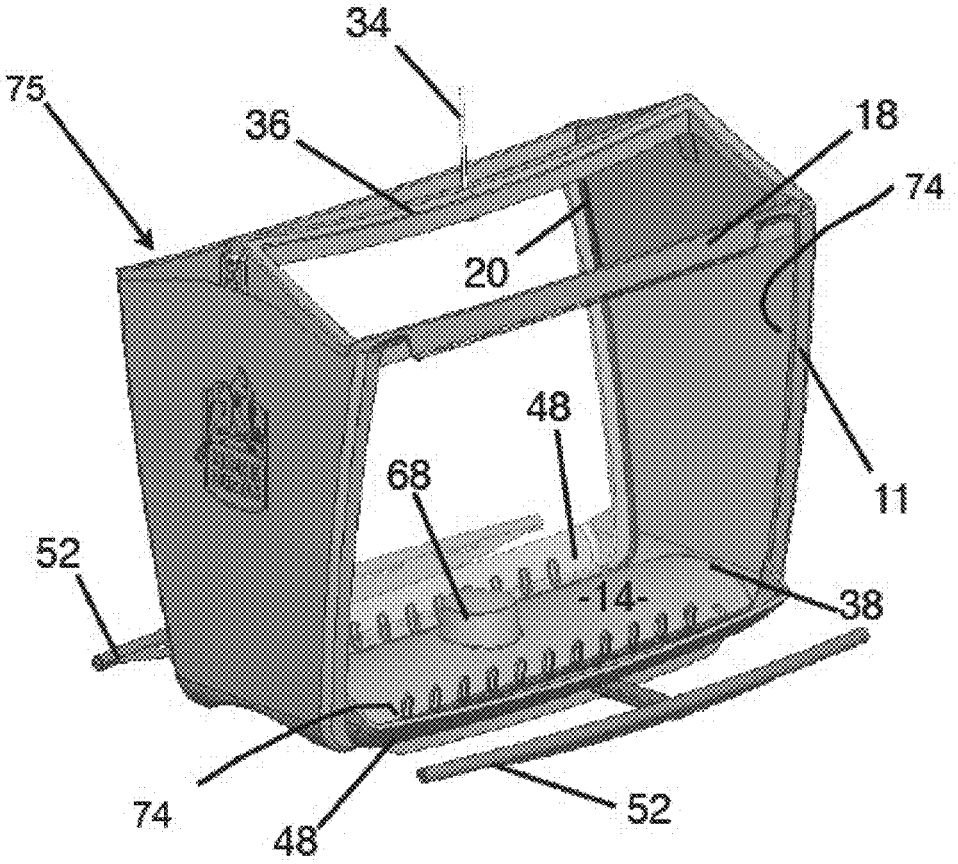
FIG. 9 is a close up view of the bin with the lid removed.

When assembled in the thistle seed feeding configuration as seen in FIG. 9 the thistle ports are lined in close proximity to the bottom of the bin, adjacent the feeding trough 48 integrally formed along each lateral edge the bin floor. The bottom of the bin floor arches up in the middle to help move the supply of seeds towards these thistle ports at the feeding station *5* for feeding such small birds. Each of the two perches can be adjusted accordingly as will be detailed.

Figure 10:
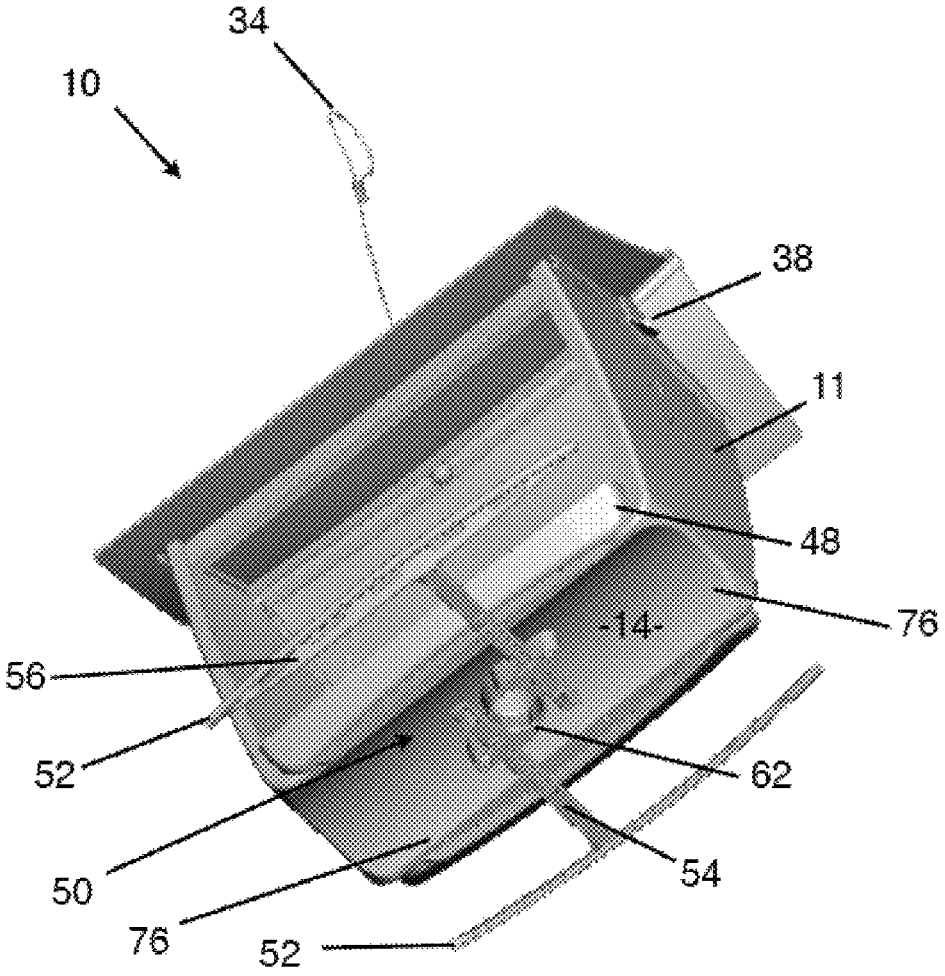
FIG. 10 is a perspective bottom view showing the adjustable perch assembly.

Referring to FIG. 10, the relationship of the adjustable perch assembly 50 and the rest of the bird feeder can be seen. The adjustable perch assembly 50 is positioned inboard of the floor edge portions 76. One can see the pair of feeding troughs 48 and 48 adjacent the perches 52. These are relatively small feeding troughs to retain the seed immediately next to the thistle ports or to the single arch large seed port. Projecting beyond the edge of each trough, an arc-shaped elongated perch 52 is cantilevered from the bottom of the bin by a detented support arm 54. Each perch has a structural member 56 which helps support the relatively small diameter stick-like perch grip. The detented elongated support arm is integrally formed with this arch shaped support, forming a single injection molded construction.

The upper surface of the elongated support 54 includes a series of indentations or detents 58 which receive an end of a flexing finger 60 integrally formed in the perch mount 62. This flexing finger ratchets into and out of the indentations to hold the perching at an optimum position spaced from the outermost edge of the feeding trough.

Figure 11:
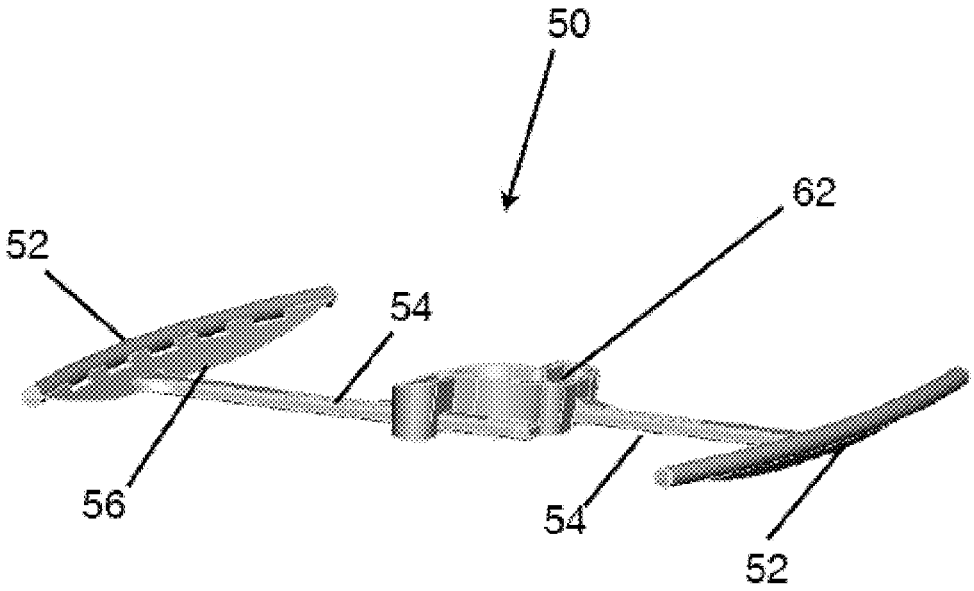
FIG. 11 is a detailed perspective view of the adjustable perch assembly.
Figure 12:
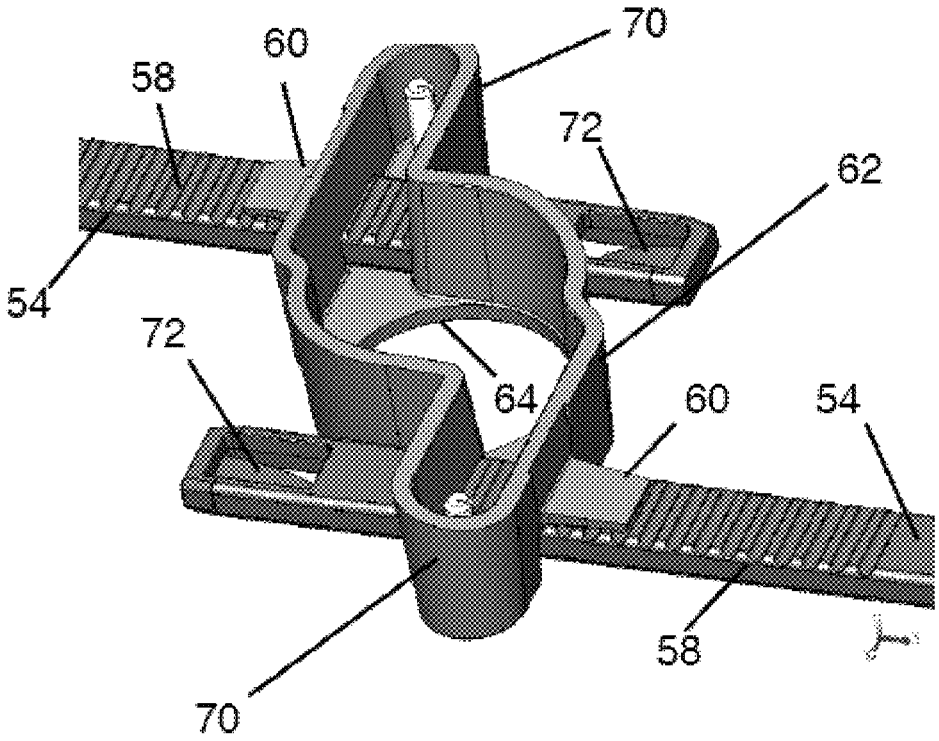
FIG. 12 is a detailed view of the combination pole support and adjustable perches.
Figure 13:
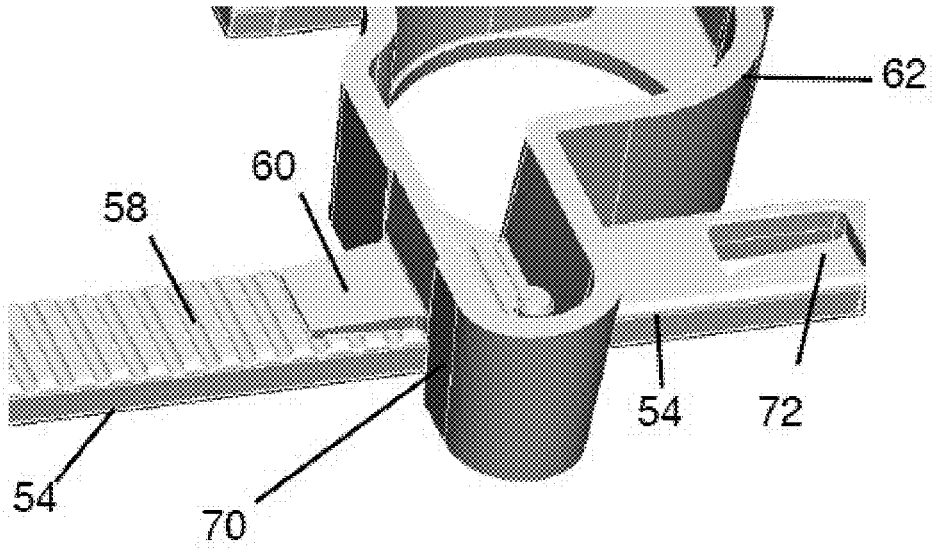
FIG. 13 is a close up view of the detent used to control the positioning of one of the two adjustable perches.

Referring to FIGS. 11 through 13 the hopper perch mount 62 has the overall shape of a Z. The center portion 64 forms a cylindrical cavity which is continuation of the cylindrical receiver 68 *shown, for example, in FIGS. 1-2,* in the floor of the hopper chassis, and thus forms a fairly secure and convenient pole mount if the owner chooses to support the in feeder on a slim pole. This is sometimes desirable since the feeder is designed to feed birds only, not squirrels. Sometimes squirrels can be prevented from accessing the bin feeder by fastening it to a tall, smooth pole to keep squirrels from reaching the feeder by climbing the pole, and erecting the pole far from trees where a squirrel might jump down onto the feeder from an adjacent tree.

The perch mount also includes two laterally extending perch support receivers 70. These have correspondingly shaped rectangular holes in the opposed walls of each receiver, one wall having the integrally formed detent finger extending from its outer face. Note that the distal end of the perch support includes a detent finger 72 that flexes into the rectangular holes of the receiver 70 of the perch mount when the perch support is first inserted into the perch mount, but springs outwardly to prevent the perch from being completely removed from the perch mount. When the bin feeder is sold, the perches are pushed into and up against the lower edge of the bin chassis for reduced shipping volume and display but each perch can be pulled out to an optimum position for the particular birds sought to be attracted to the feeder by ratcheting the perch support out to that position. The perch supports are offset from one another to permit the supports to bypass each other in this fully retracted or collapsed state, as well as pass to each side of the pole mounting receiver or cavity. When erected and set to feed birds, the owner would pull outwardly on the perch support to the chosen perch position, which position will be held by the disclosed detent ratchet, etc.

The invention claimed is:

1. A feeder for wild birds comprising:

a bin having edge portions and a feeding station, the bin adapted to hold bird seed; and at least one sidewall having a first edge disposed opposite a second edge, the first edge having a relatively large slot and the second edge having a plurality of relatively small ports, the sidewall being invertible, such that the edge portions of the bin are adapted to receive the sidewall in an orientation based on a size of the bird seed, the orientation positioning the first edge adjacent to the feeding station where the size of the bird seed is relatively large and the orientation positioning the second edge adjacent to the feeding station where the size of the bird seed is relatively small; and a perch positioned adjacent to the feeding station, an elongated support member engaged to the perch, the elongated support member including a plurality of ratchet detents, where the support member is received in a ratchet perch mount mounted to and below a floor of the bin.

2. The feeder of claim 1, wherein the ratchet perch mount includes a flexible finger to engage the plurality of ratchet detents and hold the perch at a one of a plurality of distances away from the feeding station.

3. The feeder of claim 1, wherein the floor includes edge portions, the ratchet perch mount positioned inward from the floor edge portions.

4. The feeder of claim 1, wherein the ratchet perch mount is positioned adjacent to and coaxial with a socket to engage an end of a support pole.

5. The feeder of claim 1, wherein the bin includes a floor defining a socket adapted to engage an end of a support pole.

6. The feeder of claim 1, wherein the feeding station includes a trough adapted to receive the large seeds via the large slot and the small seeds via the plurality of small ports.

7. The feeder of claim 1, wherein the slot is defined by tabs located at opposite sides of the first edge and a gap extending along the first edge between the tabs.

8. The feeder of claim 1, wherein the at least one sidewall is transparent.

9. The feeder of claim 1, wherein the at least one sidewall is a panel of substantially uniform thickness.

10. The feeder of claim 1, further comprising:

a roof adapted to engage the bin to cover the supply of seed.

11. The feeder of claim 10, wherein the roof defines an opening to receive a hanger wire engaged to a ridge beam of the bin, and where the roof is detachable from the bin.

12. A feeder for wild birds comprising:

a bin having a feeding station, the bin adapted to hold a supply of seed;

at least one sidewall having a first edge and a second edge, the first edge having a relatively large slot and the second edge having a plurality of relatively small ports, the at least one sidewall being invertible such that either the first edge or the second edge may be selectively positioned adjacent to the feeding station; and a perch including a support defining a series of ratchet detents, the support projecting from an inboard receiver mounted to the bin and received in a ratchet perch mount permitting the perch to be positioned at varying distances from the feeding station.

13. The feeder of claim 12, wherein the large slot is sized to permit relatively large seeds to pass therethrough and the small ports are sized to permit relatively small seeds to pass therethrough.

14. The feeder of claim 12, wherein the inboard receiver is positioned adjacent a socket adapted to engage an upper end of a support pole.

* * * * *